(12) United States Patent
An et al.

(10) Patent No.: US 12,306,634 B2
(45) Date of Patent: May 20, 2025

(54) AUTONOMOUS MOBILE UNMANNED SPRAYER APPARATUS, OPERATING METHOD THEREOF, AND METHOD OF CONTROLLING AUTONOMOUS RAIL SWITCHING MOVEMENT

(71) Applicant: ELECTRONICS AND TELECOMMUNICATIONS RESEARCH INSTITUTE, Daejeon (KR)

(72) Inventors: Su Yong An, Daejeon (KR); Dongyeop Kang, Daejeon (KR); Song Li, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 177 days.

(21) Appl. No.: 18/142,758

(22) Filed: May 3, 2023

(65) Prior Publication Data
US 2023/0400862 A1   Dec. 14, 2023

(30) Foreign Application Priority Data
Jun. 14, 2022   (KR) .......................... 10-2022-0072180

(51) Int. Cl.
*G05D 1/00*   (2024.01)
*A01M 7/00*   (2006.01)

(52) U.S. Cl.
CPC .......... *G05D 1/0225* (2013.01); *A01M 7/0021* (2013.01); *G05D 1/0246* (2013.01)

(58) Field of Classification Search
CPC .... G05D 1/0225; G05D 1/0246; A01M 7/0021
See application file for complete search history.

(56) References Cited

U.S. PATENT DOCUMENTS

| 9,554,507  | B2 | 1/2017 | Park et al. |
| 10,579,460 | B2 | 3/2020 | Kim et al. |

(Continued)

FOREIGN PATENT DOCUMENTS

| KR | 10-2012-0041910 A | 5/2012 |
| KR | 10-1460991 B1     | 11/2014 |

(Continued)

*Primary Examiner* — Hunter B Lonsberry
*Assistant Examiner* — Harrison Heflin
(74) *Attorney, Agent, or Firm* — LRK PATENT LAW FIRM (57) ABSTRACT

The unmanned sprayer apparatus according to the present invention includes a vehicle body of the unmanned sprayer apparatus that moves automatically in a greenhouse including a first rail and a second rail installed on flat land, and a controller configured to control the vehicle body to be switched and moved between the first rail and the second rail while the vehicle body travels on the flat land. The controller is configured to travel the vehicle body rearward on the first rail and when a front end of the first rail is detected, stop the vehicle body, to move the vehicle body laterally toward the second rail and when a front end of the second rail is detected, stop the vehicle body, and to align the vehicle body in a direction of the second rail and then dock the vehicle body to the second rail.

16 Claims, 8 Drawing Sheets

(56) References Cited

U.S. PATENT DOCUMENTS

| | | | | |
|---|---|---|---|---|
| 2015/0144156 A1* | 5/2015 | French | ............... | B08B 1/30 |
| | | | | 134/6 |
| 2016/0375814 A1* | 12/2016 | Jochim | ............ | B60B 19/02 |
| | | | | 414/547 |
| 2019/0332119 A1* | 10/2019 | Kim | ............... | G05D 1/0248 |
| 2021/0237526 A1* | 8/2021 | Williams | ............ | B60F 1/04 |
| 2021/0354922 A1* | 11/2021 | Gravelle | ............ | B65G 1/12 |
| 2022/0072921 A1* | 3/2022 | Ostrowski | ............ | B60F 1/02 |
| 2024/0032458 A1* | 2/2024 | Xu | ............... | A01G 9/26 |
| 2024/0217743 A1* | 7/2024 | Sweeney | ............ | G11B 15/6835 |

FOREIGN PATENT DOCUMENTS

| | | | | |
|---|---|---|---|---|
| KR | 10-1804735 B1 | 12/2017 | | |
| KR | 10-1935838 B1 | 1/2019 | | |
| KR | 10-2019-0080208 A | 7/2019 | | |
| KR | 10-2178927 B1 | 11/2020 | | |
| KR | 10-2021-0006821 A | 1/2021 | | |
| WO | WO-2021123292 A1 * | 6/2021 | ............ | A01G 9/143 |

* cited by examiner

PERSPECTIVE
TRANSFORMATION

FIG. 11

AUTONOMOUS MOBILE UNMANNED SPRAYER APPARATUS, OPERATING METHOD THEREOF, AND METHOD OF CONTROLLING AUTONOMOUS RAIL SWITCHING MOVEMENT

CROSS-REFERENCE TO RELATED APPLICATION

This application claims priority to and the benefit of Korean Patent Application No. 10-2022-0072180, filed on Jun. 14, 2022, the disclosure of which is incorporated herein by reference in its entirety.

BACKGROUND

1. Field of the Invention

The present invention relates to an autonomous mobile unmanned sprayer apparatus that can be used in a greenhouse having rails for heating and the like, an operating method thereof, and a method of controlling autonomous rail switching movement.

2. Description of Related Art

In greenhouses for growing tomatoes, paprika, and the like, there are rails for greenhouse heating on a growing ground. In addition to the purpose of greenhouse heating, these rails for heating may be used as a means of movement for towing crops, harvesting crops, transporting harvested crops, facility work, and the like.

Figure 1:
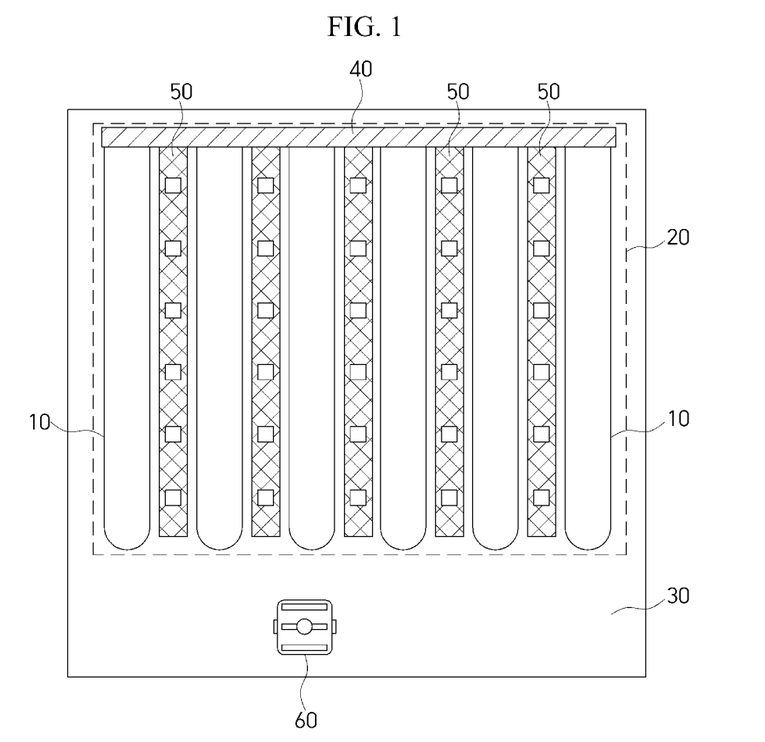
FIG. 1 is a plan view of a greenhouse environment in which rails for pipe heating are installed.

FIG. 1 is a plan view of a greenhouse environment in which rails 10 are installed.

The greenhouse environment is broadly composed of a rail area 20 in which the rails 10 are gathered and a flat land area 30 which is an area other than the rail area 20. Each of the rails 10 gathered in the rail area 20 is connected to a heating water supply tube 40 to receive heating water and transmit heat over a wide area. A crop bed 50 is placed between the rails 10. An autonomous mobile robot 60 that performs spraying, crop transport, harvesting, etc., performs work while moving in the greenhouse, and the mobile robot 60 moves across the flat land area 30 and the rail area 20. Therefore, it is necessary to control a motion of the mobile robot 60 when being docked to the rails so as to safely switch the driving of the mobile robot 60 between the flat land area 30 and the rail area 20, and it is necessary to perform rail detection first prior to rail docking.

The rail detection may be performed using an onboard sensor mounted on the mobile robot 60. As the onboard sensor for rail detection, a vision sensor (rail detection through images, and use of artificial landmarks such as quick response (QR)-code), radio-frequency identification (RFID), a three-dimensional (3D) light detection and ranging (LiDAR) sensor, or the like may be used. For more accurate rail detection, a tilting laser scanner may be used.

Meanwhile, effective spraying for grown crops in open fields and greenhouses greatly affects farm productivity and profitability. In particular, since a greenhouse is an enclosed space, the greenhouse is often too hot and humid so that it is suitable for conditions for occurrence of various diseases and pests, and thus timely or periodic spray is essential. Greenhouse spray work is divided into a method of spraying chemicals while a worker directly moves a chemical container, and a method of automatically spraying chemicals using a machine. If an area of a greenhouse is so large, a lot of labor is required for spray by workers, and safety issues such as pesticide poisoning of workers occur in particular. Therefore, recently, in medium-sized or larger greenhouses (about 9,900 $m^2$ or more), spraying is mainly performed using automated machines.

In the conventional automation-based unmanned spray, spraying is also performed based on autonomous movement by utilizing the rails 10 and the autonomous mobile robot for unmanned spray (hereinafter, referred to as an unmanned sprayer apparatus). However, autonomous movement of most unmanned sprayer apparatuses is only possible forward or rearward on the rail 10, and rail switching movement between the rails 10 should be performed by a worker himself or herself, and thus this cannot be called complete unmanned spray. Therefore, in the case of a 9,900 m 2 greenhouse, approximately seventy (70) to eighty (80) rails 10 are included, and thus the labor of workers is required in proportion to the number of the rails.

SUMMARY OF THE INVENTION

Therefore, the present invention is directed to providing a configuration of an autonomous driving-based unmanned sprayer apparatus that can perform rail switching movement without worker intervention in a greenhouse for growing tomatoes, paprika, and the like, in which rails for heating, etc., are installed, an operating method thereof, and a method of controlling autonomous rail switching movement.

According to an aspect of the present invention, there is provided an unmanned sprayer apparatus capable of autonomous rail switching movement, including a vehicle body of the unmanned sprayer apparatus that moves automatically in a greenhouse including a first rail and a second rail installed on a flat land, and a controller configured to control the vehicle body to be switched and moved between the first rail and the second rail while the vehicle body travels on the flat land, wherein the controller is configured to travel the vehicle body rearward on the first rail and when a front end of the first rail is detected, stop the vehicle body, to move the vehicle body laterally toward the second rail and when a front end of the second rail is detected, stop the vehicle body, and to align the vehicle body in a direction of the second rail and then dock the vehicle body to the second rail.

According to another aspect of the present invention, there is provided a method of controlling rail switching movement of the unmanned sprayer apparatus that moves automatically in a greenhouse including a first rail and a second rail installed on a flat land, the method including traveling a vehicle body rearward on the first rail and when a front end of the first rail is detected, stopping the vehicle body, moving the vehicle body laterally toward the second rail and when a front end of the second rail is detected, stopping the vehicle body, and aligning the vehicle body in a direction of the second rail and then docking the vehicle body to the second rail.

According to still another aspect of the present invention, there is provided a method of operating the unmanned sprayer apparatus that moves automatically in a greenhouse including a first rail and a second rail installed on a flat land, the method including recognizing the first rail, extracting a main line of the first rail, and correcting a heading angle of the unmanned sprayer apparatus so that the unmanned sprayer apparatus is aligned to be parallel to the main line, when the heading angle is corrected so that the unmanned sprayer apparatus is aligned to be parallel to the main line of the first rail, traveling the unmanned sprayer apparatus forward on the first rail, allowing the unmanned sprayer apparatus to spray chemicals while traveling the unmanned sprayer apparatus rearward at an end point of the first rail, when a front end of the first rail is recognized, stopping the unmanned sprayer apparatus and moving the unmanned sprayer apparatus laterally to start switching to the second rail, when a front end of the second rail is recognized, stopping the lateral movement of the unmanned sprayer apparatus, extracting a main line of the second rail, and estimating a direction of the second rail, and correcting the heading angle of the unmanned sprayer apparatus so that the unmanned sprayer apparatus is aligned to be parallel to the estimated direction of the second rail, aligning the unmanned sprayer apparatus in the direction of the second rail, and traveling the unmanned sprayer apparatus forward on the second rail.

The above-described configurations and operations of the present invention will become more apparent from embodiments described in detail below with reference to the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. The terms used in the following descriptions are used for describing the exemplary embodiments of the present invention and are not intended to limit the present invention. In this specification, the singular forms also include the plural forms unless otherwise specified. Further, it will be understood that the terms "include," "including," "comprise," and/or "comprising," when used herein, specify some stated components, steps, operations, and/or elements but do not preclude the presence or addition of one or more other components, steps, operations, and/or elements.

Figure 2:
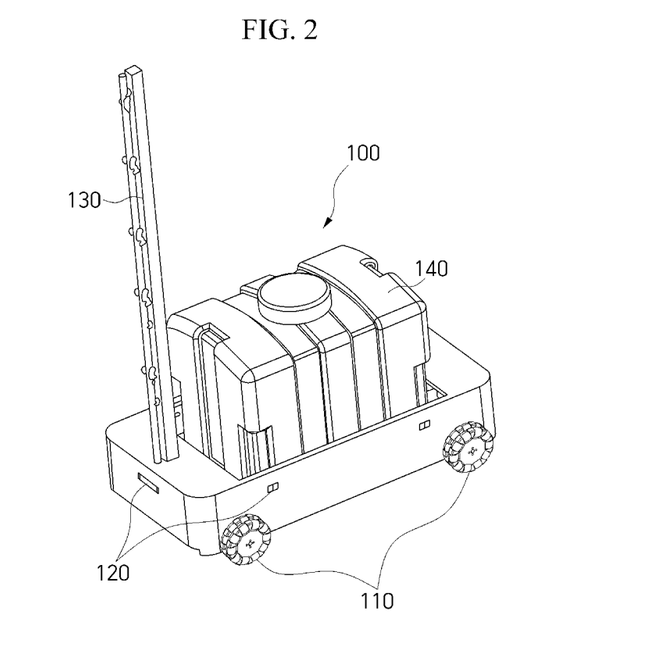
FIG. 2 is a conceptual diagram of an autonomous driving-based unmanned sprayer apparatus according to the present invention.

FIG. 2 is a conceptual diagram of a configuration of an autonomous driving-based unmanned sprayer apparatus according to the present invention. An unmanned sprayer apparatus 100 of the present invention may be broadly composed of a driving unit 110 for traveling both on a flat land and on rails, a sensor unit 120 for recognizing an environment, a pump and nozzle unit 130 for spraying chemicals, a chemical container 140, and the like. In particular, the driving unit 110 for traveling on a flat land and rails needs to be designed as a special driving unit that can travel on both a flat land area and a rail area and is suitable for switching between rails by the shortest distance within the shortest period of time. Further, in the unmanned sprayer apparatus 100 of the present invention, the sensor unit 120 for recognizing a driving environment is required for safe unmanned autonomous driving.

Figure 3:
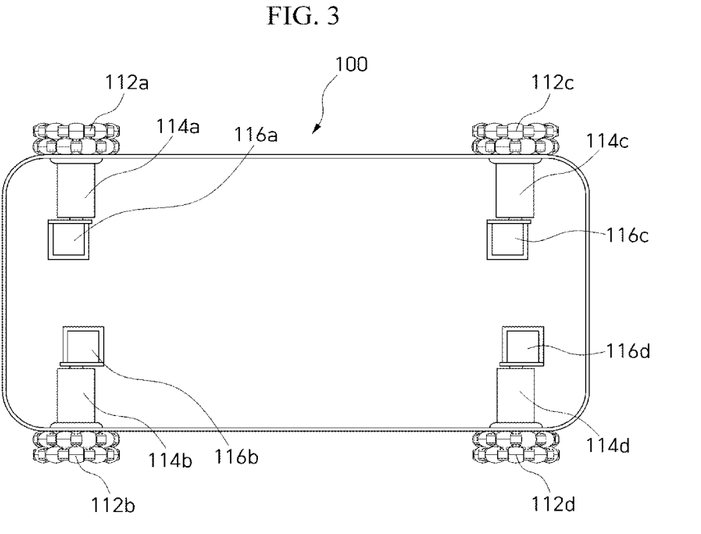
FIG. 3 illustrates a configuration of a driving unit for traveling on a flat land area and a rail area.

First, a configuration of the driving unit 110 for traveling on the flat land area and the rail area will be described with reference to FIG. 3. FIG. 3 illustrates a bottom surface of the unmanned sprayer apparatus 100 turned over. The unmanned sprayer apparatus 100 is basically configured in a four-wheel drive mechanism. Each of four wheels 112a to 112d for traveling on the flat land is brought into contact with a floor surface (ground). Further, rollers 114a to 114d for rails are provided in the form of cylinders sharing drive shafts with the wheels 112a to 112d for a flat land, respectively, so as to travel on the rails. The rollers 114a to 114d for rails are brought into contact with the rails 10 without being brought into contact with the ground to move the unmanned sprayer apparatus 100 along the rails 10. When the unmanned sprayer apparatus 100 travels on the flat land area with the wheels 112a to 112d for a flat land and then is docked to the rails 10 to enter the rail area, the rollers 114a and 114b connected to two front wheels 112a and 112b are brought into contact with the rails 10 so that the unmanned sprayer apparatus 100 travels on the rails 10 due to a frictional force caused by the contact with the rails.

In FIG. 3, reference numerals "116a to 116d" denote gearboxes including driving motors for individually driving the wheels 112a to 112d for a flat land and the rollers 114a to 114d for rails, for each wheel and roller. The gearboxes 116a to 116d each including the driving motor may individually control the four wheels 112a to 112d and the rollers 114a to 114d, respectively, forward and reverse directions.

Figure 4:
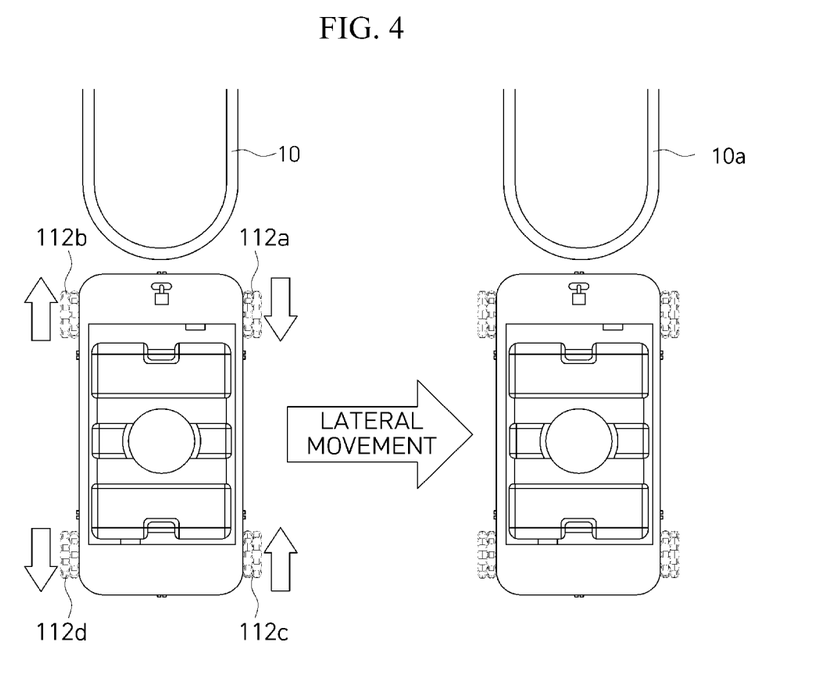
FIG. 4 illustrates an unmanned sprayer apparatus (100) switched from a current rail (10) to another rail (10') by moving laterally.

The driving unit 110 of the unmanned sprayer apparatus 100 requires a component for switching rails by the shortest distance within the shortest period of time. When a general differential driving type unmanned mobile robot is used, 180° rotation of a vehicle body and translation movement corresponding to an interval between rails are required for rail switching movement. However, in an embodiment of the present invention, the unmanned sprayer apparatus 100 is configured by applying mecanum wheels to the wheels 112a to 112d for a flat land so that the unmanned sprayer apparatus 100 can directly move laterally without changing a heading angle of the unmanned sprayer apparatus 100 during the rail switching movement. Therefore, the operation of the 180° rotation of the vehicle body can be eliminated, and it becomes possible to perform rail switching with movement by the shortest distance within the shortest period of time (see FIG. 4). That is, as illustrated in FIG. 4, by individually controlling the wheels 112a to 112d for a flat land forward or rearward, to which the mecanum wheels are applied, (e.g., a first wheel 112a rotates reversely, a second wheels 112b rotates forward, a third wheels 112c rotates forward, and a fourth wheels 112d rotates reversely), the unmanned sprayer apparatus 100 is moved laterally to be switched from a current rail 10 to another rail 10a by the shortest distance within the shortest period of time.

Next, a configuration of the sensor unit 120 for recognizing an environment will be described.

As described above, the autonomous driving of the unmanned sprayer apparatus 100 is performed on the flat land area and the rail area. When the unmanned sprayer apparatus 100 travels on the flat land area, the rail switching movement is performed. In order to detect the presence or absence of an obstacle on the sides while the unmanned sprayer apparatus 100 moves laterally for rail switching, a plurality of ultrasonic sensors (e.g., two ultrasonic sensors) disposed on each side of the unmanned sprayer apparatus 100 are included in the sensor unit 120. In a plan view of the unmanned sprayer apparatus 100 illustrated in FIG. 5A, it can be seen that ultrasonic sensors 122a and 122b for recognizing right obstacles are installed on a right side of the vehicle body and ultrasonic sensors 122c and 122d for recognizing left obstacles are installed on a left side of the vehicle body.

Meanwhile, in the rail area, the unmanned sprayer apparatus 100 can travel only forward or rearward. In order to recognize the presence or absence of rails during forward traveling and to detect obstacles in front (e.g., within 1 meter in front), a stereo vision sensor 124 installed on a front of the unmanned sprayer apparatus 100 is included in the sensor unit 120 of the unmanned sprayer apparatus 100 as illustrated in the plan view of FIG. 5A and the front view of FIG. 5B. The stereo vision sensor 124 may output information on an image obtained by capturing the front of the unmanned sprayer apparatus 100 with a color image and a depth image. The depth image output from the stereo vision sensor 124 may be used by an autonomous driving controller (not illustrated) of the unmanned sprayer apparatus 100 to determine the presence or absence of an obstacle in front. Further, the color image output from the stereo vision sensor 124 may be used by the autonomous driving controller of the unmanned sprayer apparatus 100 to recognize the rails 10 when the vehicle body is traveling forward, extract main lines of the rails therefrom, and correct the heading angle of the unmanned sprayer apparatus 100 so that the unmanned sprayer apparatus 100 is aligned to be parallel to the rails 10. Here, the recognition of the main line of the rail will be described later.

Figure 5A:
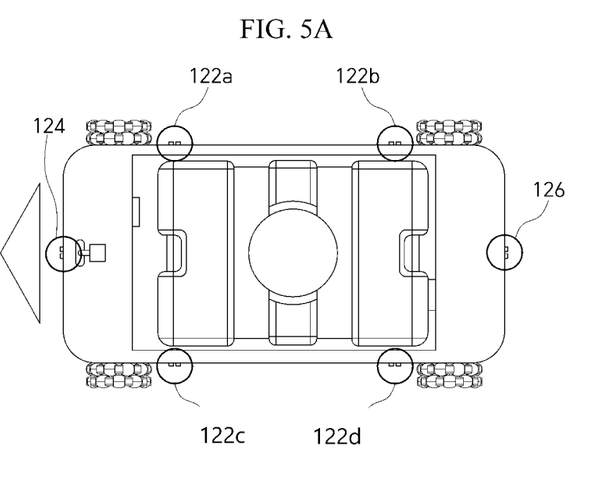
FIGS. 5A and 5B are a plan view and a front view of an unmanned sprayer apparatus (100) for describing a configuration of a sensor unit (120)

Further, a rear ultrasonic sensor 126 for detecting a rear obstacle when the vehicle body is traveling rearward in the rail area may be additionally included in the sensor unit 120 of the unmanned sprayer apparatus 100 (see FIG. 5A).

Figure 5B:
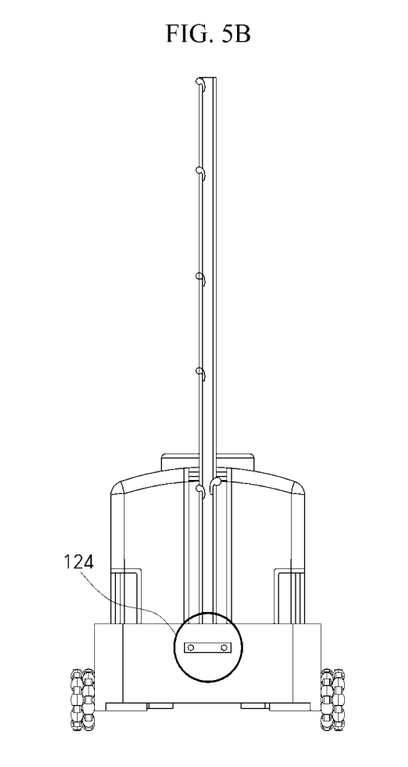

The configuration of the sensor unit 120 of the unmanned sprayer apparatus 100 is summarized in the following table.

| Sensor types | Installation locations | Functions |
| --- | --- | --- |
| Side ultrasonic sensors | Two each on left side and right side of unmanned sprayer apparatus (100) | To detect short-distance obstacles on left and right sides |
| Rear ultrasonic sensor | One on rear of unmanned sprayer apparatus (100) | To detect short-distance obstacles in rear |
| Stereo vision sensor | One on front of unmanned sprayer apparatus (100) | To detect short-distance obstacles in front (by depth image) To recognize rails (by color image) To correct heading angle so that unmanned sprayer apparatus is aligned to be parallel to rails (by color image) |

The autonomous driving algorithm or control method of the unmanned sprayer apparatus 100 described above will be described with reference to FIGS. 6 and 7. The autonomous driving algorithm or control method of the unmanned sprayer apparatus 100 may be performed by the autonomous driving controller included in the unmanned sprayer apparatus 100 described above. Greenhouse spray work starts when a worker places the unmanned sprayer apparatus 100 in front of the rails 10 through a remote controller. In subsequent processes, the autonomous driving controller of the unmanned sprayer apparatus 100 automatically performs the driving algorithm.

Figure 6:
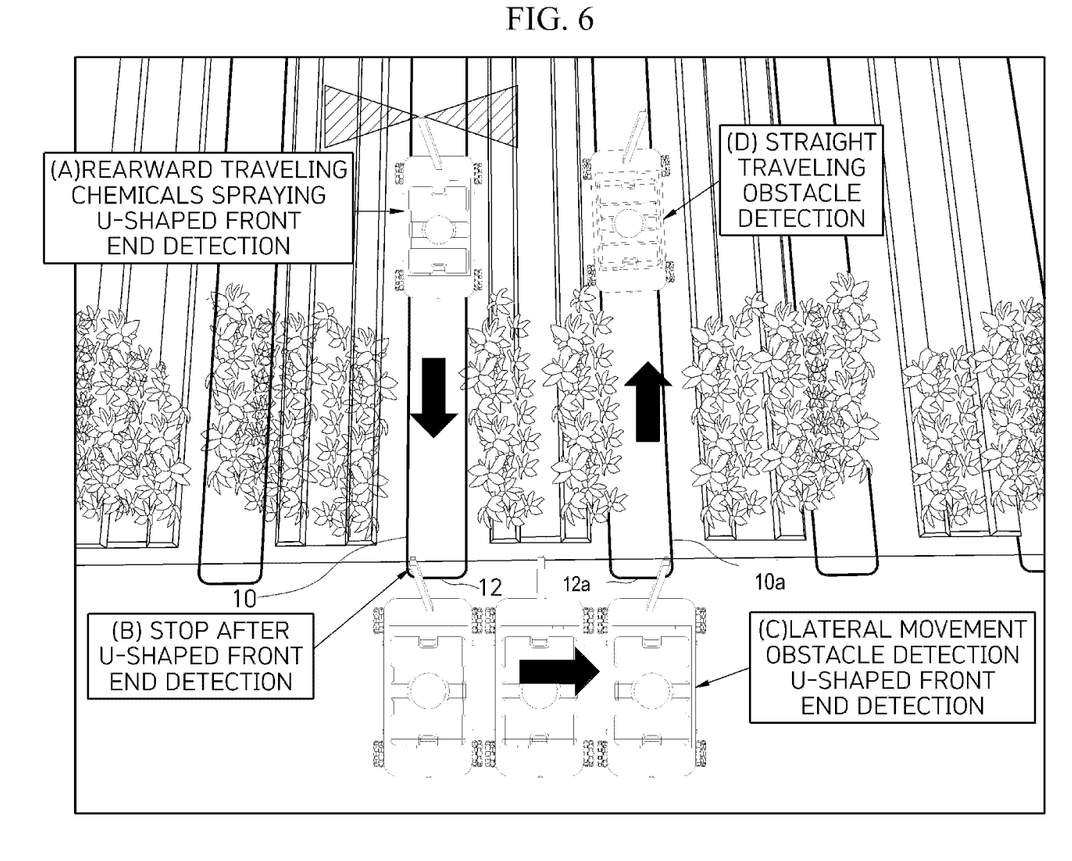
FIG. 6 is a conceptual diagram for graphically and schematically describing an autonomous driving procedure of an unmanned sprayer apparatus (100)
Figure 7:
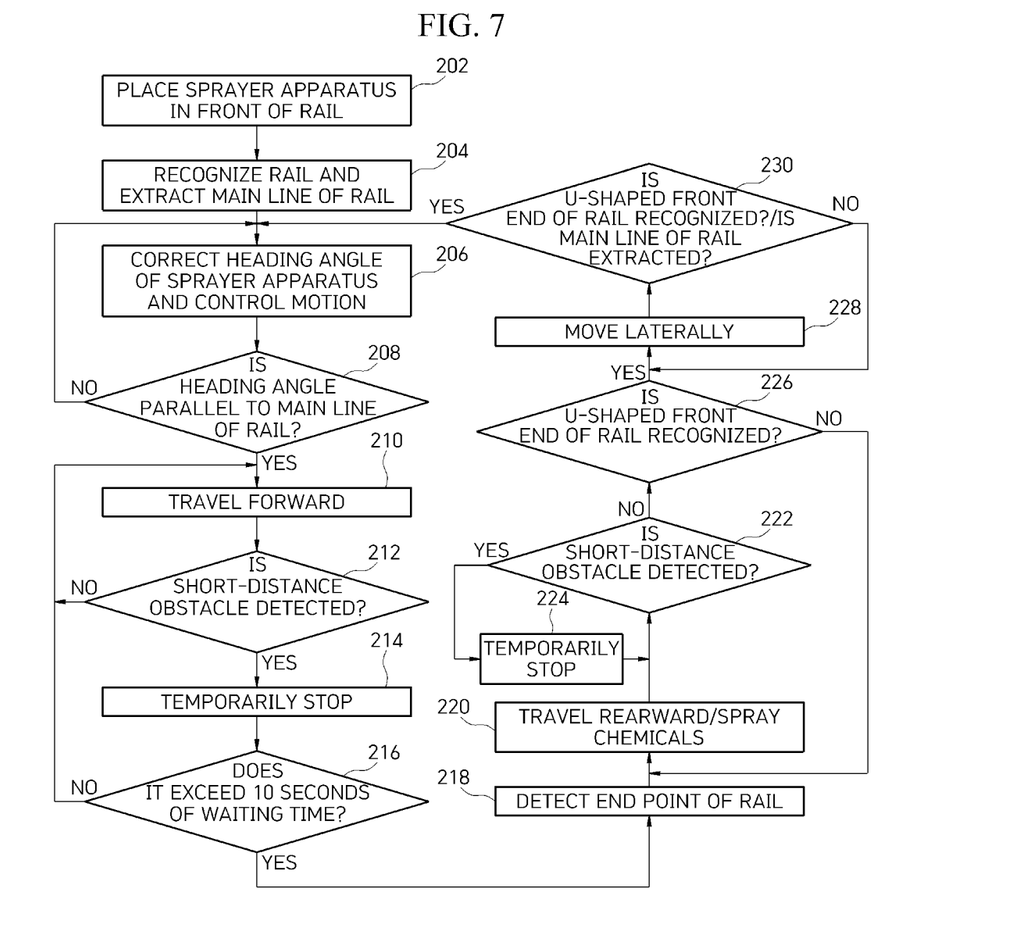
FIG. 7 is a flowchart of a process of an autonomous driving algorithm of an unmanned sprayer apparatus.

FIG. 6 is a diagram for graphically and schematically describing autonomous driving and spray operation of the unmanned sprayer apparatus 100, and FIG. 7 is a flowchart of a process of an autonomous driving algorithm or control method performed by the autonomous driving controller of the unmanned sprayer apparatus.

First, the autonomous driving and spray operation of the unmanned sprayer apparatus 100 will be briefly explained with reference to FIG. 6. As described before (in FIG. 3), the unmanned sprayer apparatus 100 travels on the flat land with the wheels 112a to 112d and travels on the rails with the rollers 114a and 114b. When the unmanned sprayer apparatus 100 is docked at a front end 12 of a first rail 10, the apparatus 100 travels straight to a distal end of the first rail 10 while detecting an obstacle on the first rail 10: (A) If the distal end of the first rail 10 is detected according to the straight traveling on the first rail 10, the unmanned sprayer apparatus 100 sprays chemicals while traveling rearward. The spraying of the chemicals and the traveling rearward continue until the stereo vision sensor 124 installed on the front of the vehicle body detects the front end 12 (e.g., U-shaped front end) of the first rail 10. (B) When the U-shaped front end 12 of the first rail 10 is detected, the unmanned sprayer apparatus 100 stops. Here, the state of the detection of the U-shaped front end 12 denotes that the unmanned sprayer apparatus 100 leaves the first rail 10 and reaches the flat land. (C) The unmanned sprayer apparatus 100 positioned on the flat land moves laterally by controlling the wheels 112a to 112d for a flat land described above in order to perform a switching movement to a second rail 10a. When the wheels 112a to 112d for a flat land are implemented as mecanum wheels, the apparatus 100 may move laterally by the shortest distance within the shortest period of time. When the apparatus 100 moves laterally, the ultrasonic sensor on the right side (or left side) detects whether there is an obstacle in the moving direction. When a U-shaped front end 12a of the second rail 10a is detected in front of the vehicle body due to the lateral movement, the unmanned sprayer apparatus 100 stops, aligns the vehicle body according to the direction of the second rail 10a, moves forward, and is docked to the second rail 10a. (D) The unmanned sprayer apparatus 100 now travels straight along the second rail 10a while detecting an obstacle to travel straight to the distal end of the second rail 10*a*. Thereafter, the processes after the process (A) are repeated.

Next, the process of autonomous driving of the unmanned sprayer apparatus will be described in detail with reference to FIG. 7.

202: First, a worker or operator places the unmanned sprayer apparatus 100 in front of a first rail 10 using a remote controller. Here, the front of the rail 10 refers to the flat land in which the U-shaped front end 12 of the first rail 10 described in FIG. 6 may be seen.

204 and 206: The unmanned sprayer apparatus 100 (more practically, autonomous driving controller) recognizes the first rail 10 through the stereo vision sensor 124 installed on the front of the vehicle body, extracts main lines of the first rail 10, and corrects a heading angle thereof so that the vehicle body is aligned to be parallel to the main lines. Details of the rail recognition, the main line extraction, and the heading angle correction will be described below.

208, 210, and 212: When the heading angle is corrected so that the vehicle body is aligned to be parallel to the main lines of the first rail 10, the unmanned sprayer apparatus 100 travels forward on the first rail 10 and goes toward a distal end of the rail 10 while detecting an obstacle in front.

214 and 216: If the unmanned sprayer apparatus 100 detects the obstacle in front while traveling forward, the apparatus 100 temporarily stops and then waits for a predetermined waiting period of time (e.g., 10 seconds).

218: If the unmanned sprayer apparatus 100 continues to detect the obstacle even after the waiting period of time, the apparatus 100 determines that the detected object is not the obstacle but the distal end of the first rail 10.

220: At the end point of the first rail 10, the unmanned sprayer apparatus 100 sprays chemicals while traveling rearward.

222, 224: When the unmanned sprayer apparatus 100 travels rearward while spraying the chemicals, the rear ultrasonic sensor 126 detects whether there is a rear short-distance obstacle. If the obstacle is detected, the unmanned sprayer apparatus 100 temporarily stops and waits until the obstacle is removed.

226: The unmanned sprayer apparatus 100 detects the U-shaped front end 12 of the first rail 10 using the front stereo vision sensor 124 while continuing to travel rearward.

228: If the U-shaped front end 12 of the first rail 10 is recognized, it is determined that the unmanned sprayer apparatus 100 is undocked from the rails (having reached the flat land area leaving out of the rail area), and thus the unmanned sprayer apparatus 100 stops, and moves laterally while detecting a lateral short-distance obstacle using the side ultrasonic sensors 122*a* and 122*b* or 122*c* and 122*d* to start rail switching. Even when the unmanned sprayer apparatus 100 moves laterally for rail switching, the unmanned sprayer apparatus 100 continuously detects an obstacle, and temporarily stands by when an obstacle is detected.

230: The unmanned sprayer apparatus 100 uses the front stereo vision sensor 124 while moving laterally to continuously detect whether the U-shaped front end 12*a* of the second rail 10*a* appears. When the U-shaped front end 12*a* of the second rail 10*a* is recognized, the unmanned sprayer apparatus 100 stops the lateral movement and extracts main lines of the second rail 10*a* from a color image (rail image) of the stereo vision sensor 124 to estimate a direction of the second rail 10*a*.

206: The unmanned sprayer apparatus 100 corrects a heading angle of the vehicle body so that the vehicle body is aligned to be parallel to the direction of the second rail 10*a* estimated from the extracted main lines and aligns the vehicle body in the direction of the second rail. Then, the process of the above operations is repeatedly performed while spraying the chemicals until the chemicals in the chemical container is exhausted.

The rail recognition, the main line extraction, and the heading angle correction based on the stereo vision sensor 124 explained above will be described in more detail.

Figure 8:
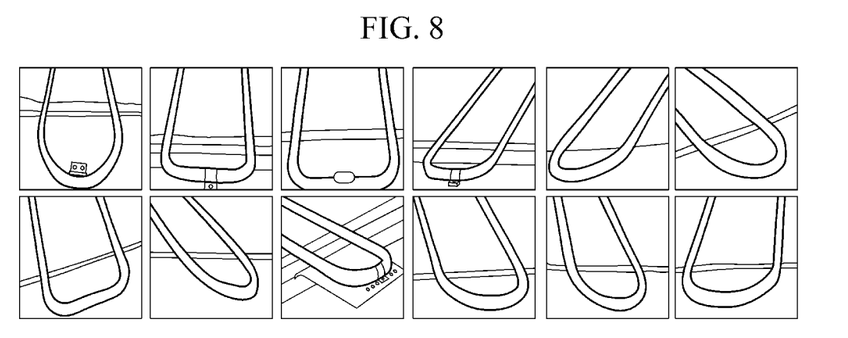
FIG. 8 is a set of exemplary diagrams of training images for rail recognition.

For automatic rail docking of the unmanned sprayer apparatus 100, it is necessary to accurately recognize the positions and directions of the rails. To this end, in the present invention, deep learning-based object recognition technology is used. That is, the U-shaped front end 12 of the rail 10 is detected by training rail images directly acquired from an actual greenhouse (see FIG. 8). FIG. 8 shows training data (training images) of various shapes of U-shaped front ends for training a U-shaped front end of a rail.

Figure 9:
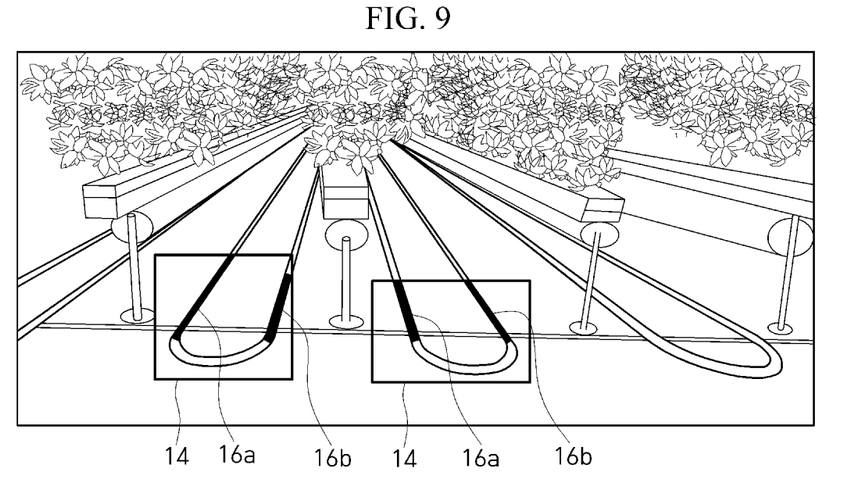
FIG. 9 is an exemplary diagram of a result of extracting main lines of rails through image processing.
Figure 10:
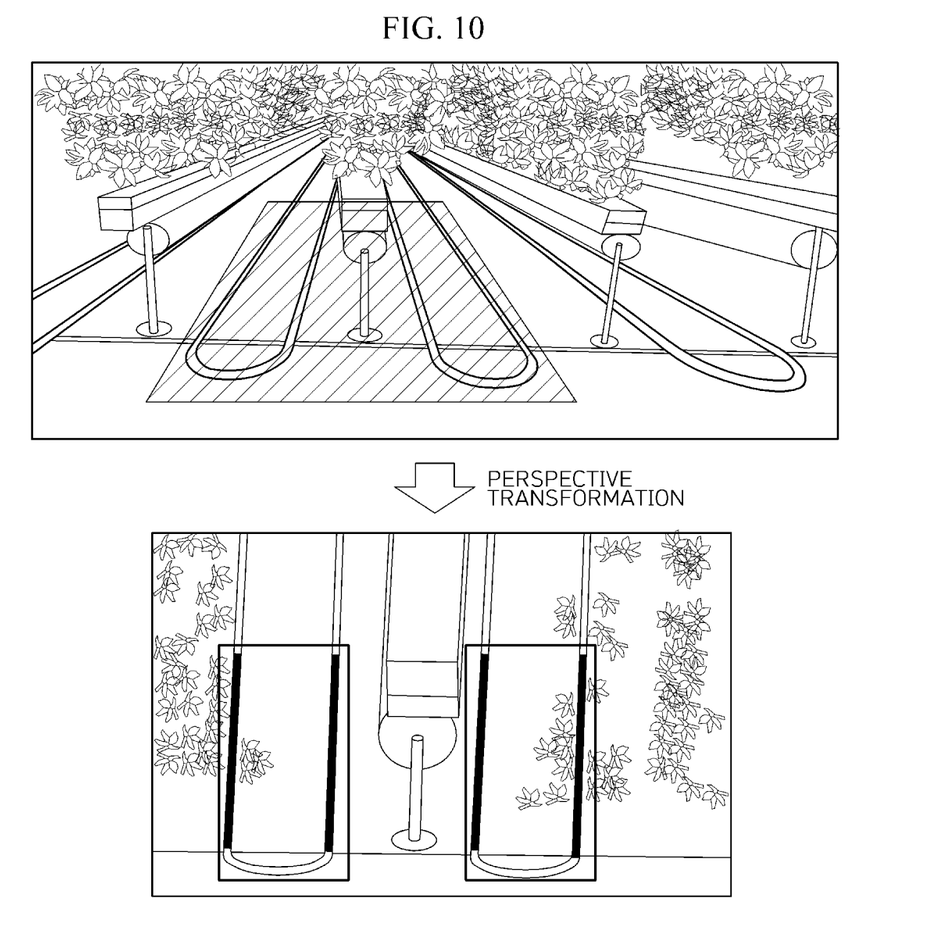
FIG. 10 is an exemplary diagram for describing extraction of angles of main lines in image spaces after perspective transformation of an image.

Thereafter, as illustrated in FIG. 9, when the rail area is recognized from the color image of the front stereo vision sensor 124 using the ability to recognize the U-shaped front end of the rail obtained through training, two main lines 16*a* and 16*b* of rails are extracted from a bounding box 14 representing a rail area of the corresponding image through image processing. However, the two extracted main lines 16*a* and 16*b* are actually parallel, but are not expressed in parallel in the image, and thus the image is corrected using perspective transformation (see FIG. 10). A left side of FIG. 10 shows the rails 10 being expressed not in parallel in the image, and a right side shows the rails 10 and the main lines 16*a* and 16*b* being aligned to be parallel to each other through the perspective transformation.

By controlling the driving unit of the unmanned sprayer apparatus 100 to be parallel to the main lines 16*a* and 16*b* in the image corrected in this way, the heading angle is corrected, and thus the vehicle body is aligned.

Figure 11:
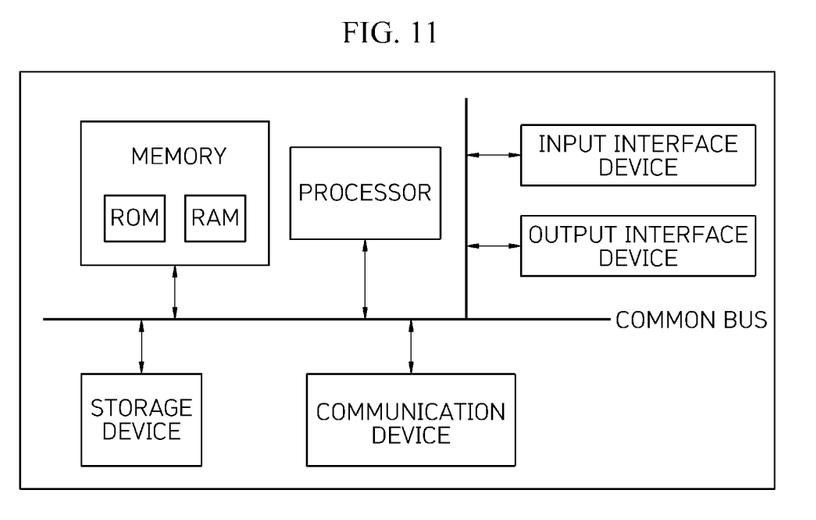
FIG. 11 illustrates a configuration of a computer system by which an autonomous driving controller of an unmanned sprayer apparatus is implemented.

The autonomous driving controller of the unmanned sprayer apparatus described above may be implemented in a computer and/or a software program. FIG. 11 is a block diagram illustrating a computer system that can be utilized for this purpose.

The computer system illustrated in FIG. 11 may include at least one of a processor, a memory, an input interface device, an output interface device, and a storage device that communicate via a common bus. The computer system may further include a communication device connected to a network. The processor may be a central processing unit (CPU) or a semiconductor device that executes instructions stored in the memory or the storage device. The communication device may transmit or receive a wired signal or a wireless signal. The memory and the storage device may include various types of volatile or non-volatile storage media. In addition, the memory may include a read only memory (ROM) and a random-access memory (RAM). The memory may be positioned inside or outside the processor, and the memory may be connected to the processor through various known units.

Therefore, the present invention may be implemented as a method implemented in a computer or as a non-transitory computer-readable medium having computer-executable instructions stored therein. In an embodiment, when the computer-executable instructions are executed by the processor, the computer-executable instructions may perform the method according to at least one aspect of the present invention.

Further, the method according to the present invention may be implemented in the form of program instructions that can be executed through various computer units and recorded on computer readable media. The computer readable media may include program instructions, data files, data structures, or combinations thereof. The program instructions recorded on the computer readable media may be specially designed and prepared for the embodiments of the invention or may be available well-known instructions for those skilled in the field of computer software. The computer readable media may include a hardware device configured to store and execute program instructions. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and perform the program instructions. Examples of the program instruction include machine code generated by a compiler and high-level language code that can be executed in a computer using an interpreter and the like.

According to the present invention, the configurations of the driving unit and the sensor unit of the autonomous driving-based unmanned sprayer apparatus that can be used in a greenhouse (greenhouse for growing tomatoes, paprika, and the like) with rails, and a method of controlling the same are provided, and thus it is possible to perform the rail switching movement by the shortest distance within the shortest period of time so that the time for spraying can be reduced, and it is possible to reduce the labor of the worker due to the autonomous rail switching movement.

In the above, embodiments embodying the spirit of the present invention in detail have been described. However, the technical scope of the present invention is not limited to the embodiments and drawings described above, but is determined by reasonable interpretation of the claims.

What is claimed is:

1. An unmanned sprayer apparatus capable of autonomous rail switching movement, comprising:
    a vehicle body of the unmanned sprayer apparatus that moves automatically in a greenhouse including a first rail and a second rail installed on a flat land; and
    a controller configured to control the vehicle body to be switched and moved between the first rail and the second rail while the vehicle body travels on the flat land,
    wherein the controller is configured to travel the vehicle body rearward on the first rail; when a front end of the first rail is detected, to stop the vehicle body; to move the vehicle body laterally toward the second rail; when a front end of the second rail is detected, to stop the vehicle body; and to align the vehicle body in a direction of the second rail and then to dock the vehicle body to the second rail,
    wherein the controller is further configured to detect the front end of the detected rail through training of a rail image and extract a main line of the detected rail through image processing.

2. The unmanned sprayer apparatus of claim 1, wherein the vehicle body includes a wheel for a flat land for traveling on the flat land and a roller for rail for traveling on a rail.

3. The unmanned sprayer apparatus of claim 2, wherein the wheel for a flat land includes a mecanum wheel.

4. The unmanned sprayer apparatus of claim 2, wherein the roller for rail shares a drive shaft with the wheel for a flat land.

5. The unmanned sprayer apparatus of claim 2, wherein the wheel for a flat land and the roller for rail are provided with a plurality of wheels for a flat land and a plurality of rollers for rails, respectively, and the plurality of wheels for a flat land and the plurality of rollers for rails are allowed to be individually controlled in a forward or reverse direction.

6. The unmanned sprayer apparatus of claim 1, wherein the vehicle body includes a sensor for detecting the first rail and the second rail, and
    the controller is further configured to correct a heading angle of the vehicle body so that the vehicle body is aligned to be parallel to the rail detected by the sensor.

7. The unmanned sprayer apparatus of claim 1, wherein the vehicle body includes a sensor for detecting the presence or absence of an obstacle when the vehicle body moves.

8. The unmanned sprayer apparatus of claim 1, wherein the main line of the detected rail extracted by the controller is provided with a plurality of main lines, and
    the controller is further configured to correct the plurality of extracted main lines in parallel.

9. A method of controlling rail switching movement of an unmanned sprayer apparatus capable of autonomous rail switching movement, which is a method of controlling the rail switching movement of the unmanned sprayer apparatus that moves automatically in a greenhouse including a first rail and a second rail installed on a flat land, the method comprising:
    traveling a vehicle body rearward on the first rail and when a front end of the first rail is detected, stopping the vehicle body;
    moving the vehicle body laterally toward the second rail and when a front end of the second rail is detected, stopping the vehicle body; and
    aligning the vehicle body in a direction of the second rail and then docking the vehicle body to the second rail,
    wherein the method further comprises detecting the front end of the detected rail through training of a rail image and extracting a main line of the detected rail through image processing.

10. The method of claim 9, further comprising correcting a heading angle of the vehicle body so that the vehicle body is aligned to be parallel to the detected rail.

11. The method of claim 9, wherein the extracted main line of the detected rail is provided with a plurality of main lines, and
    the method further includes correcting the plurality of extracted main lines in parallel.

12. A method of operating an autonomous mobile unmanned sprayer apparatus, which is a method of operating the unmanned sprayer apparatus that moves automatically in a greenhouse including a first rail and a second rail installed on flat land, the method comprising:
    recognizing the first rail, extracting a main line of the first rail, and correcting a heading angle of the unmanned sprayer apparatus so that the unmanned sprayer apparatus is aligned to be parallel to the main line;
    when the heading angle is corrected so that the unmanned sprayer apparatus is aligned to be parallel to the main line of the first rail, traveling the unmanned sprayer apparatus forward on the first rail;
    allowing the unmanned sprayer apparatus to spray chemicals while traveling the unmanned sprayer apparatus rearward at an end point of the first rail;
    when a front end of the first rail is recognized, stopping the unmanned sprayer apparatus and moving the unmanned sprayer apparatus laterally to start switching to the second rail;
    when a front end of the second rail is recognized, stopping the lateral movement of the unmanned sprayer apparatus, extracting a main line of the second rail, and estimating a direction of the second rail; and correcting the heading angle of the unmanned sprayer apparatus so that the unmanned sprayer apparatus is aligned to be parallel to the estimated direction of the second rail, aligning the unmanned sprayer apparatus in the direction of the second rail, and traveling the unmanned sprayer apparatus forward on the second rail, wherein the method further comprises detecting the front end of the detected rail through training of a rail image and extracting a main line of the detected rail through image processing.

13. The method of claim 12, further comprising, when an obstacle is detected while the unmanned sprayer apparatus travels forward or rearward, stopping the unmanned sprayer apparatus and allowing the unmanned sprayer apparatus to wait for a preset waiting period of time.

14. The method of claim 13, further comprising, when the obstacle is continuously detected even after the waiting period of time, determining that the obstacle is the end point.

15. The method of claim 12, further comprising, when the obstacle is detected while the unmanned sprayer apparatus moves laterally, stopping the unmanned sprayer apparatus and allowing the unmanned sprayer apparatus to wait for a preset waiting period of time.

16. The method of claim 12, wherein the extracted main line of the detected rail is provided with a plurality of main lines, and the method further includes correcting the plurality of extracted main lines in parallel.

* * * * *